(12) United States Patent
Mestha et al.

(10) Patent No.: US 8,072,646 B2
(45) Date of Patent: Dec. 6, 2011

(54) APPARATUS AND METHOD FOR COLOR CONTROL OF CLEAR COATED IMAGES ON MEDIA

(75) Inventors: Lalit Keshav Mestha, Fairport, NY (US); Peter Stanley Fisher, Pasadena, CA (US)

(73) Assignee: Xerox Corporation, Norwalk, CT (US)

( * ) Notice: Subject to any disclaimer, the term of this patent is extended or adjusted under 35 U.S.C. 154(b) by 838 days.

(21) Appl. No.: 12/143,040

(22) Filed: Jun. 20, 2008

(65) Prior Publication Data

US 2009/0316165 A1 Dec. 24, 2009

(51) Int. Cl.
*H04N 1/60* (2006.01)
*H04N 1/46* (2006.01)
*G03F 3/08* (2006.01)
*G06K 9/00* (2006.01)

(52) U.S. Cl. ......... 358/1.9; 358/504; 358/518; 382/162; 382/167

(58) Field of Classification Search .................... 358/1.9, 358/504, 518; 382/162, 167
See application file for complete search history.

(56) References Cited

U.S. PATENT DOCUMENTS

| | | | |
|---|---|---|---|
| 5,452,094 A | 9/1995 | Ebner et al. | |
| 6,157,469 A | 12/2000 | Mestha | |
| 6,178,007 B1 | 1/2001 | Harrington | |
| 6,222,648 B1 | 4/2001 | Wolf et al. | |
| 6,344,902 B1 | 2/2002 | Duke et al. | |
| 6,584,435 B2 | 6/2003 | Mestha et al. | |
| 6,721,692 B2 | 4/2004 | Mestha et al. | |
| 6,744,531 B1 | 6/2004 | Mestha et al. | |
| 6,934,053 B1 | 8/2005 | Mestha et al. | |
| 7,069,164 B2 * | 6/2006 | Viturro et al. | 702/85 |
| 7,110,143 B2 | 9/2006 | Bares et al. | |
| 7,307,752 B1 | 12/2007 | Mestha et al. | |
| 7,375,851 B2 | 5/2008 | Mestha | |
| 7,738,140 B2 * | 6/2010 | Hancock et al. | 358/1.9 |
| 7,768,672 B2 * | 8/2010 | Gil et al. | 358/1.9 |
| 2004/0141193 A1 | 7/2004 | Mestha | |

(Continued)

OTHER PUBLICATIONS

Provisional U.S. Appl. No. 61/056,327, filed May 27, 2008; Mestha et al.

(Continued)

*Primary Examiner* — Charlotte M Baker
(74) *Attorney, Agent, or Firm* — Matthew C. Loppnow; Prass LLP (57) ABSTRACT

An apparatus (100) and method (200) that controls color of a clear coated image on media is disclosed. The apparatus may include a controller (110) configured to control operations of the apparatus. The apparatus may include a memory (120) coupled to the controller. The memory may include reference color information corresponding to a desired color of an output image. The apparatus may include a front end (130) configured to provide a marking engine control signal corresponding to the desired color of the output image. The apparatus may include a color marking engine (140) coupled to the front end, where the color marking engine can be configured to generate an image on media responsive to the marking engine control signal using image output settings. The apparatus may include a clear coat finisher (150) configured to coat the image on the media with a clear coat to create a clear coated image on the media. The apparatus may include a sensor (160) configured to measure color attributes of the clear coated image and configured to provide color information of the clear coated image. The controller can be configured to determine a difference between the color information of the clear coated image and the reference color information and can be configured to adjust the image output settings according to the difference between the color information and the reference color information to achieve adjusted image output settings.

20 Claims, 4 Drawing Sheets

U.S. PATENT DOCUMENTS

| | | |
|---|---|---|
| 2005/0030560 A1 | 2/2005 | Maltz et al. |
| 2008/0037069 A1 | 2/2008 | Mestha et al. |
| 2008/0043263 A1 | 2/2008 | Hancock et al. |
| 2008/0043264 A1 | 2/2008 | Gil et al. |
| 2008/0043271 A1 | 2/2008 | Gil et al. |
| 2008/0075492 A1 | 3/2008 | Mestha et al. |

OTHER PUBLICATIONS

U.S. Appl. No. 11/959,824, filed Dec. 19, 2007; Mestha et al.

Xerox; Automated Color Quality, Automation Tools and Color Process Control Systems for DocuColor 8000AP using FreeFlow Print Server; 2007, Monrovia, CA.

* cited by examiner

APPARATUS AND METHOD FOR COLOR CONTROL OF CLEAR COATED IMAGES ON MEDIA

BACKGROUND

Disclosed herein is an apparatus and method that controls color of clear coated images on media.

Presently, image output devices, such as printers, multi-function media devices, xerographic machines, and other devices can print color images on media, such as sheets, paper, substrates, transparencies, plastic, cardboard, or other media. Whether an image is printed one time on one device or multiple times on multiple devices, over a short or extended period of time, color consistency is both needed and expected. For example, a designer may design an image that requires specific colors, such as colors that must match exact colors of a company's logo or colors that must match industry standard colors. The designer requires consistency and accuracy of the colors in the image each time the image is printed, even when the image is printed at different times and/or printed on different printing devices. Such color consistency can be critical because it can determine the difference between success and failure in meeting customer requirements.

After an image is printed, a clear coat finish can be applied to the printed image to highlight certain areas of the image, to protect the printed image, or to give the image a shiny or vibrant color. For example, an ultraviolet, aqueous, or laminate clear coat finish can be applied to printed images. These clear coat finishes can be applied to an entire page to enhance and protect the page or can be applied to selected sections of the page to draw attention to the sections.

Unfortunately, such clear coat finishes can cause the perceived color of the printed image to shift away from the desired color of the image. This color shift becomes a problem when color consistency between images is required and when images must include specific spot colors. For example, the spot colors can be used to match colors from a printed piece or design to specific colors desired by a designer. When printed spot colors are clear coated, the clear coat finish can cause the perceived color of the finished product to be different from the desired color. Such a difference can result in a failure to meet designer and customer color requirements. Thus, there is a need for an apparatus and method that controls the color of clear coated images on media.

SUMMARY

An apparatus and method that controls the color of clear coated images on media is disclosed. The apparatus may include a controller configured to control operations of the apparatus. The apparatus may include a memory coupled to the controller. The memory may include reference color information corresponding to a desired color of an output image. The apparatus may include a front end configured to provide a marking engine control signal corresponding to the desired color of the output image. The apparatus may include a color marking engine coupled to the front end, where the color marking engine can be configured to generate an image on media responsive to the marking engine control signal using image output settings. The apparatus may include a clear coat finisher configured to coat the image on the media with the color or interest with a clear coat to create a clear coated image on the media. The apparatus may include a sensor configured to measure color attributes of the clear coated image and configured to provide color information of the clear coated image. The controller can be configured to determine a difference between the color information of the clear coated image and the reference color information, and can be configured to adjust the image output settings according to the difference between the color information and the reference color information to achieve adjusted image output settings.

BRIEF DESCRIPTION OF THE DRAWINGS

In order to describe the manner in which advantages and features of the disclosure can be obtained, a more particular description of the disclosure briefly described above will be rendered by reference to specific embodiments thereof which are illustrated in the appended drawings. Understanding that these drawings depict only typical embodiments of the disclosure and are not therefore to be considered to be limiting of its scope, the disclosure will be described and explained with additional specificity and detail through the use of the accompanying drawings in which.

DETAILED DESCRIPTION

The embodiments include an apparatus that controls color for clear coated images on media. The apparatus may include a controller configured to control operations of the apparatus. The apparatus may include a memory coupled to the controller, the memory including reference color information corresponding to a desired color of an output image. The apparatus may include a front end configured to provide a marking engine control signal corresponding to the desired color of the output image. The apparatus may include a color marking engine coupled to the front end, where the color marking engine can be configured to generate an image on media responsive to the marking engine control signal using image output settings. The apparatus may include a clear coat finisher configured to coat the image on the media with a clear coat to create a clear coated image on the media. The apparatus may include a sensor configured to measure color attributes of the clear coated image and configured to provide color information of the clear coated image. The controller can be configured to determine a difference between the color information of the clear coated image and the reference color information, and can be configured to adjust the image output settings according to the difference between the color information and the reference color information to achieve adjusted image output settings.

The embodiments further include a method that controls color of a clear coated image on media. The method may include providing reference color information corresponding to a desired color of an output image. The method may include producing an output image on media using image output settings and coating the output image on the media with a clear coat finish to create a clear coated output image on the media. The method may include measuring, with a sensor, color attributes of the clear coated output image to provide color information of the clear coated output image and determining a difference between the color information of the clear coated output image and the reference color information. The method may include adjusting the image output settings according to the difference between the color information and the reference color information to achieve adjusted image output settings that create a clear coated output image on the media that has color information closer to the reference color information. The method may include producing a next output image on media using the adjusted image output settings and coating the next output image on the media with a clear coat finish to create a clear coated next output image on the media.

The embodiments further include an apparatus that controls color of a clear coated image on media. The apparatus may include a controller configured to control operations of the apparatus and a memory coupled to the controller, where the memory can include reference color information having L*a*b* information corresponding to a desired color of a desired output image on media. The apparatus may include a front end configured to provide a marking engine control signal corresponding to the desired color of the desired output image. The apparatus may include a color marking engine coupled to the front end, the color marking engine configured to generate an image on media responsive to the marking engine control signal using image output settings. The apparatus may include an ultraviolet finisher configured to coat the image on the media with an ultraviolet coat to create an ultraviolet coated image on the media. The apparatus may include a spectrophotometric sensor configured to measure color attributes of the ultraviolet coated image and provide color information of the ultraviolet coated image based on the measured color attributes, the color information of the ultraviolet coated image including L*a*b* values. The controller can be configured to determine a difference between the color information of the ultraviolet coated image and the reference color information, and configured to adjust the image output settings according to the difference between the color information and the reference color information to achieve adjusted image output settings that create an ultraviolet coated image on the media that has color information closer to the reference color information. The color marking engine can be configured to produce a next image on media using the adjusted image output settings.

Figure 1:
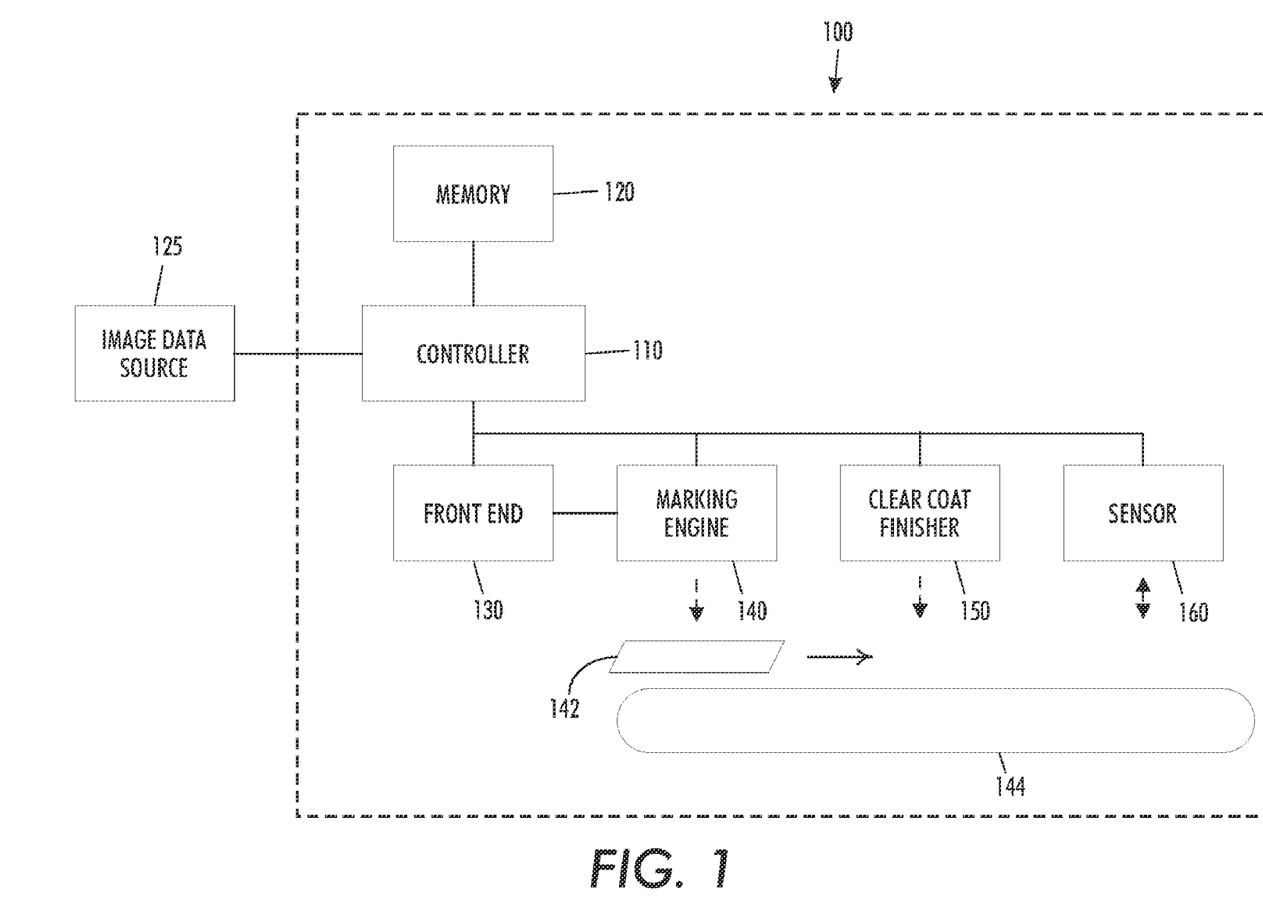
FIG. 1 is an exemplary illustration of an apparatus.

FIG. 1 is an exemplary illustration of an apparatus 100. The apparatus 100 may be an image output device such as a printer, a multifunction media device, a xerographic machine, or any other device that can produce an image on media. The apparatus 100 can include a controller 110 configured to control operations of the apparatus 100. The apparatus 100 can include a memory 120 coupled to the controller 110, where the memory 120 can include reference color information corresponding to a desired color of an output image. For example, an output image can correspond to an image file including Red, Green, and Blue (RGB) color image information or including any other information useful for providing image information for outputting an image on media. The image file can be received from an image data source 125, such as a personal computer, an image workstation, a scanner, a network, a flash memory card, or any other source for image data. The reference color information can include L*a*b* information or other reference color information corresponding to a desired color of an output image on media.

The apparatus 100 can include a front end 130 configured to provide a marking engine control signal corresponding to the desired color of the output image. The controller 110 may be located within the front end 130 or the front end 130 may be located within the controller 110, or different functions of each may be located at different locations within the apparatus 100. The marking engine control signal can include cyan, magenta, yellow, and black (CMYK) information, can include hexachromatic information, or can include any other information useful for instructing a marking engine to output an image on media.

The apparatus 100 can include a color marking engine 140 coupled to the front end 130, where the color marking engine 140 can be configured to generate an image on media 142 responsive to the marking engine control signal using image output settings. For example, the color marking engine 140 can generate an image on the media 142 as the media 142 is transported along a media transport 144. The media 142 can be a substrate, such as paper, a transparency, cardboard, or any other media. The color marking engine 140 can be configured to generate an image having at least one test patch on the media 142 using the image output settings, where the at least one test patch can include a color of interest.

The apparatus 100 can include a clear coat finisher 150 configured to coat the image on the media 142 with a clear coat to create a clear coated image on the media 142. The clear coat finisher 150 can be coupled to the controller 110. The clear coat finisher 150 can change the perceived color of the image on the media 142 when coating the image on the media 142 with a clear coat. The clear coat can be an ultraviolet clear coat, an aqueous clear coat, or any other clear coat. For example, the clear coat finisher 150 can coat the output image on the media 142 with a clear coat finish by coating media including the output image with a liquid and curing the coated media using ultraviolet light to create a clear coated output image on media. The output image on the media 142 may be spot clear coated in selected areas to accent a particular portion of the media 142 or may be flood clear coated to cover all of the media 142. The clear coat finish can also be any other coating that can coat an image on media with a clear finish. For example, the clear coat finish can be a laminate clear coat finish that can be applied to an output image on the media 142 in a process separate from the apparatus 100 or in a process coupled to the apparatus 100.

The apparatus 100 can include a sensor 160 configured to measure color attributes of the clear coated image and configured to provide color information of the clear coated image. The sensor 160 can be coupled to the controller 110. The sensor 160 can be a spectrophotometric sensor or any other image sensor configured to measure color attributes of the clear coated image to provide color information of the clear coated image. A spectrophotometric sensor can measure the wavelength of light reflected off the media 142. For example, a spectrophotometric sensor can measure light intensity as a function of the color of an image on the media 142. The color information of the clear coated image can include L*a*b* values. The controller 110 can be configured to determine a difference between the color information of the clear coated image and the reference color information and configured to adjust the image output settings according to the difference between the color information and the reference color information to achieve adjusted image output settings.

The apparatus 100 can iteratively perform a color control process until image output settings are optimal to produce the desired color of an image on media. For example, the color marking engine 140 can be configured to produce a next image on media using the adjusted image output settings. The clear coat finisher 150 can be configured to coat the next image on the media with a clear coat finish to create a clear coated next image on the media. The sensor 160 can be configured to measure color attributes of the clear coated next image to provide color information of the clear coated next image. The controller 110 can be configured to ascertain whether an optimal color has been achieved based on the color information of the clear coated next image, and configured to repeat, if an optimal color has not been achieved, determining a difference, adjusting image output settings, producing a next image, coating the next image, and measuring color attributes. The controller 110 can be configured to ascertain whether an optimal color has been achieved based on the difference between the color information of the clear coated next image and the reference color information being below a color error metric threshold.

If the desired color is outside of a gamut of colors achievable on a clear coated image produced by the color marking engine 140 and the clear coat finisher 150, the apparatus 100 can iteratively perform a color control process until image output settings are optimal to produce an optimal color of an image on media. For example, the controller 110 can be configured to ascertain whether desired colors of the clear coated image are outside of an image output gamut achievable by the image output settings of the apparatus 100. If the desired colors of the clear coated image are outside of the image output gamut achievable by the image output settings, the controller 110 can be configured to map, to the image output gamut of the apparatus 100, colors with a minimum color error metric between the desired colors of the clear coated output image and the image output gamut achievable by the image output settings.

The apparatus 100 can produce a final output image once adjusted image output settings are optimal. For example, the color marking engine 140 can be configured to produce a next image on media using the adjusted image output settings. The clear coat finisher 150 can be configured to coat the next image on the media with a clear coat finish to create a clear coated next image on the media. The sensor 160 can be configured to measure color attributes of the clear coated next image to provide color information of the clear coated next image. The controller 110 can be configured to determine adjusted image output settings are optimal based on the color information of the clear coated next image and configured to instruct the color marking engine 140 to produce a final output image on media based on the adjusted image output settings if the image output settings are optimal.

According to another related embodiment, the apparatus 100 can include a controller 110 configured to control operations of the apparatus 100. The apparatus 100 can include a memory 120 coupled to the controller, where the memory can include reference color information having L*a*b* information corresponding to a desired color of a desired output image on media. The apparatus 100 can include a front end 130 configured to provide a marking engine control signal corresponding to the desired color of the desired output image. The apparatus 100 can include a color marking engine 140 coupled to the front end 130, where the color marking engine can be configured to generate an image on media 142 responsive to the marking engine control signal using image output settings. The color marking engine 140 can be configured to generate an image having at least one test patch on the media using the image output settings, the at least one test patch including a color of interest corresponding to the desired output image. The apparatus 100 can include an ultraviolet finisher 150 configured to coat the image on the media 142 with an ultraviolet coat to create an ultraviolet coated image on the media 142. The apparatus 100 can include a spectrophotometric sensor 160 configured to measure color attributes of the ultraviolet coated image and provide color information of the ultraviolet coated image based on the measured color attributes, where the color information of the ultraviolet coated image can include L*a*b* values. The controller 110 can be configured to determine a difference between the color information of the ultraviolet coated image and the reference color information. The controller 110 can be configured to adjust the image output settings according to the difference between the color information and the reference color information to achieve adjusted image output settings that create an ultraviolet coated image on the media that has color information closer to the reference color information. The color marking engine 140 can be configured to produce a next image on media using the adjusted image output settings.

The embodiments can be used with any device that can produce a color output image on media, such as a printer, a marking engine, a Tightly Integrated Parallel Printer (TIPP) machine, or any other device than can produce a color output image on media. For example, a TIPP machine can have many integrated marking engines that can operate together as a single printer. In some uses, one marking engine can produce an image on one side of media while another marking produces an image on the other side of the media. Each marking engine on a TIPP machine can be addressed by a front end that can iteratively adjust image output settings of the marking engines according to a difference between measured color information of a coated image and reference color information to achieve desired image output settings. If only one side of the media is clear coated, the corresponding marking engine can be adjusted accordingly. Thus, multiple marking engines in a single device can be consistent with each other even when clear coating is applied to part or all of one or more final output images on different portions of media.

Figure 2:
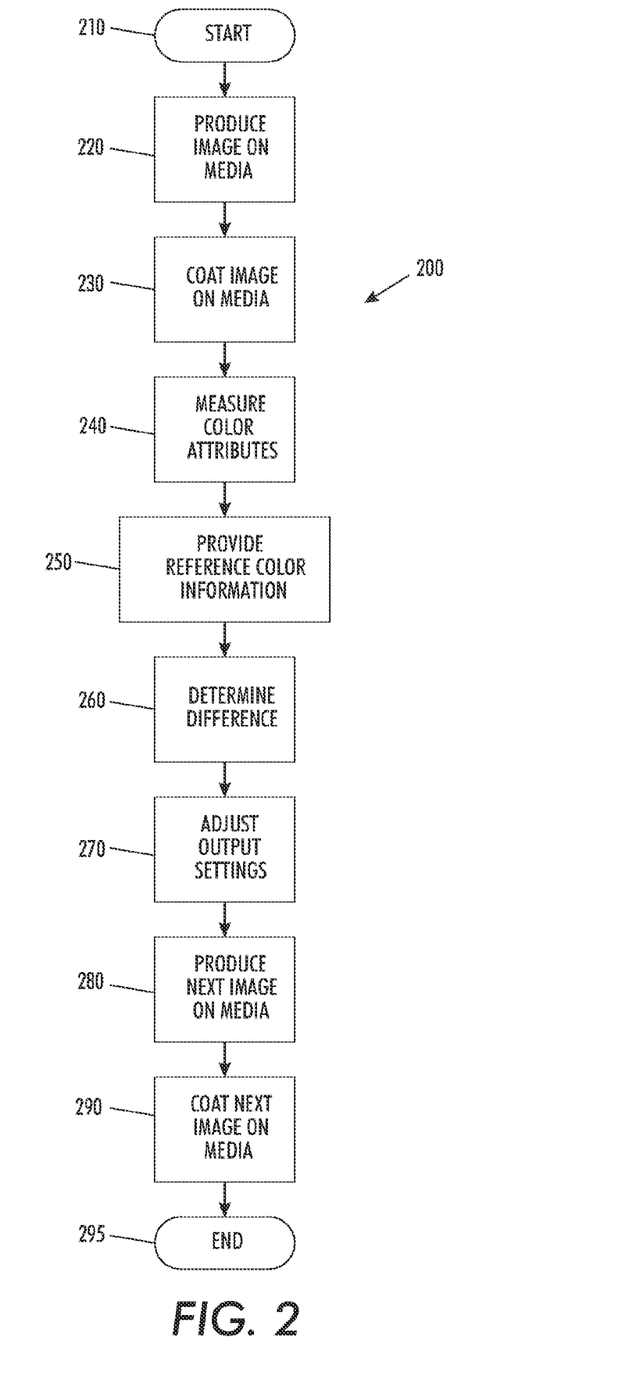
FIG. 2 is an exemplary flowchart of a method of controlling color of a clear coated image on media.

FIG. 2 is an exemplary flowchart 200 of a method of controlling color of a clear coated image on media. The method starts at 210. At 220, reference color information is provided, the reference color information corresponding to a desired color of a desired output image. The reference color information can include L*a*b* information corresponding to a desired color of a clear coated output image on media. At 230, an output image is produced on media using image output settings. A device, such as the apparatus 100, can produce the output image on media by printing the output image on a substrate using device image output settings. The image output settings can include values used by a printer, a marking engine, or other image output device. For example, the image output settings can include Cyan, Magenta, Yellow, and Key (CMYK) values, can include hexachromatic values, or can include other image output settings useful for directing a marking engine to output an image on media. The output image can include spot colors. The spot colors can be colors based on a color matching system, such as a Pantone color matching system, a Hostmann-Steinberg Druckfarben, Kast+ Ehinger Druckfarben und H. Schmincke & Co. (HKS) color matching system, a Toyo color matching system, or any other color matching system. The spot colors can also include colors based on user defined colors or other useful colors. Producing the output image can include producing an output image having at least one test patch on media, where the at least one test patch can include a color of interest. The output image can include test patches or can be based on any image output on media, such as a picture, a design, a graph, or any other image that can include spot colors.

At 240, the output image on the media is coated with a clear coat finish to create a clear coated output image on the media. The clear coat finish can be an ultraviolet clear coat finish, an aqueous clear coat finish, a laminate clear coat finish, or any other coating that can coat an image on media with a clear finish. At 250, color attributes of the clear coated output image are measured with a sensor to provide color information of the clear coated output image. Measuring color attributes of the clear coated output image can include using a sensor to measure a color of at least one clear coated patch of a spot color on the media. Spot colors can be measured with the sensor to determine if the color information of the spot colors match reference color information of the color matching system and/or color information of the user defined colors. The color attributes can be measured with a spectrophotometric sensor to provide color information of the clear coated output image, where the color information of the clear coated output image can include L*a*b* values.

Measuring and/or coating can be performed inline or offline. For example, the measurements can be taken by a sensor in a device that prints and coats the image on the media. The measurements can also be taken using a sensor separate from the device. Similarly, the coating can be performed by the device or separate from the device.

At 260, a difference is determined between the color information of the clear coated output image and the reference color information. At 270, the image output settings are adjusted according to the difference between the color information and the reference color information to achieve adjusted image output settings that create a clear coated output image on the media that has color information closer to the reference color information. Adjusting the image output settings can include adjusting the color of spot colors in the output image. The image output settings can be adjusted based on errors between measured L*a*b* values and desired L*a*b* values. A change in image output settings, such as CYMK printer settings, can be determined based on the difference between the measured L*a*b* values and desired L*a*b* values. To achieve adjusted printer settings, the change in the CMYK printer settings can be added to the printer CMYK settings used when the output image was produced for measuring the color attributes.

At 280, a next output image is produced on media using the adjusted image output settings. At 290, the next output image on the media is coated with a clear coat finish to create a clear coated next output image on the media. At 295, the method ends.

Figure 3:
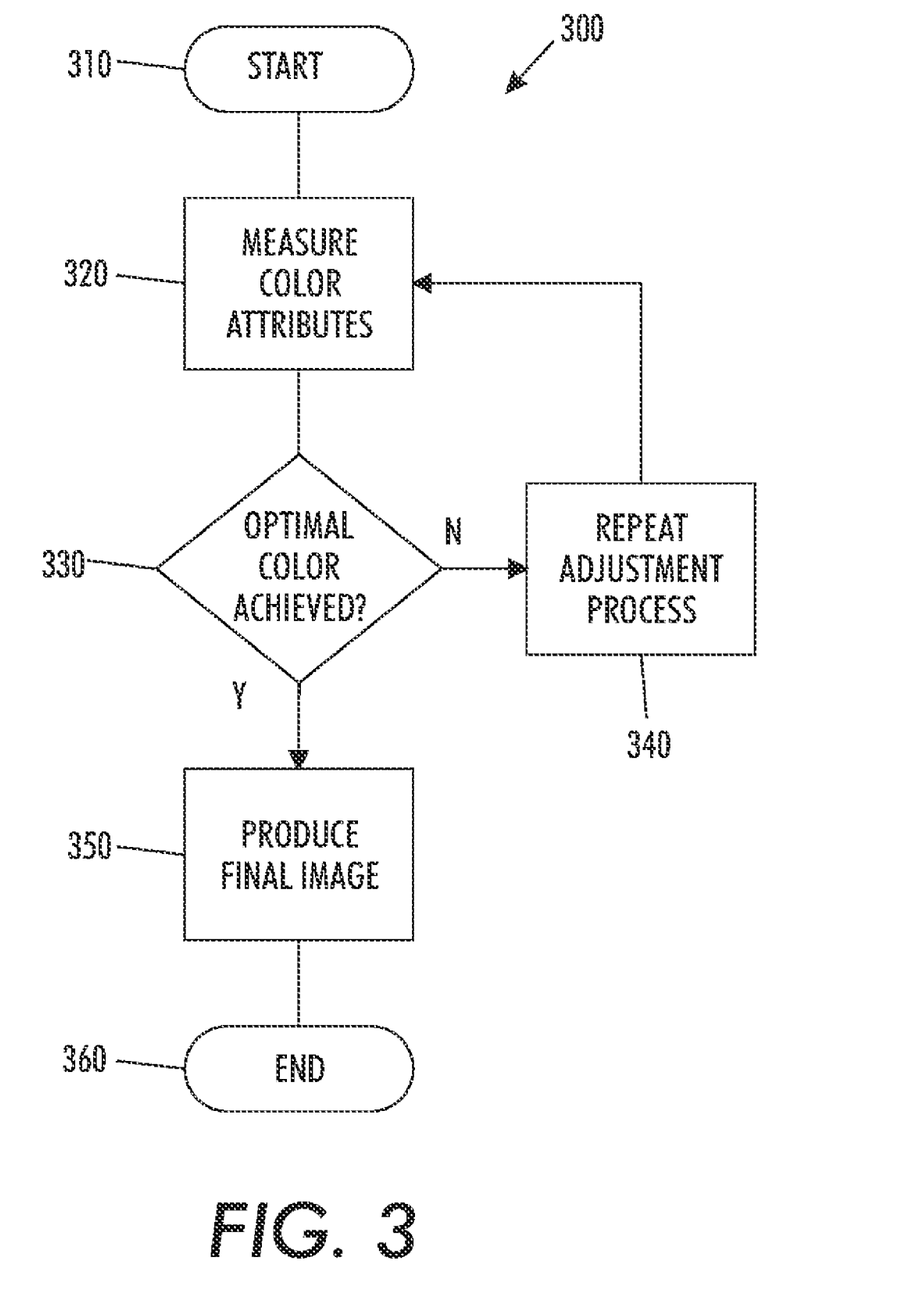
FIG. 3 is an exemplary flowchart of a method of controlling color of a clear coated image on media.

FIG. 3 is an exemplary flowchart 300 of a method of controlling color of a clear coated image on media. The flowchart 300 can operate in conjunction with the flowchart 200. The method starts at 310. At 320, color attributes of the clear coated next output image are measured with a sensor to provide color information of the clear coated next output image. At 330, a determination is made as to whether an optimal color has been achieved based on the color information of the clear coated next output image. Whether an optimal color has been achieved can be ascertained based on the difference between the color information of the clear coated next output image and the reference color information being below a color error metric threshold. The determination can be made by determining whether adjusted image output settings are optimal based on the color information of the clear coated next output image. At step 340, if an optimal color has not been achieved, a color adjustment process is repeated. For example, determining a difference 260, adjusting image output settings 270, producing a next output image 280, coating the next output image 290 of the flowchart 200 and measuring color attributes 320 can be repeated until an optimal color is achieved. At step 350, a final output image can be produced on media based on the adjusted image output settings if the adjusted image output settings are optimal. At 360, the method ends.

Figure 4:
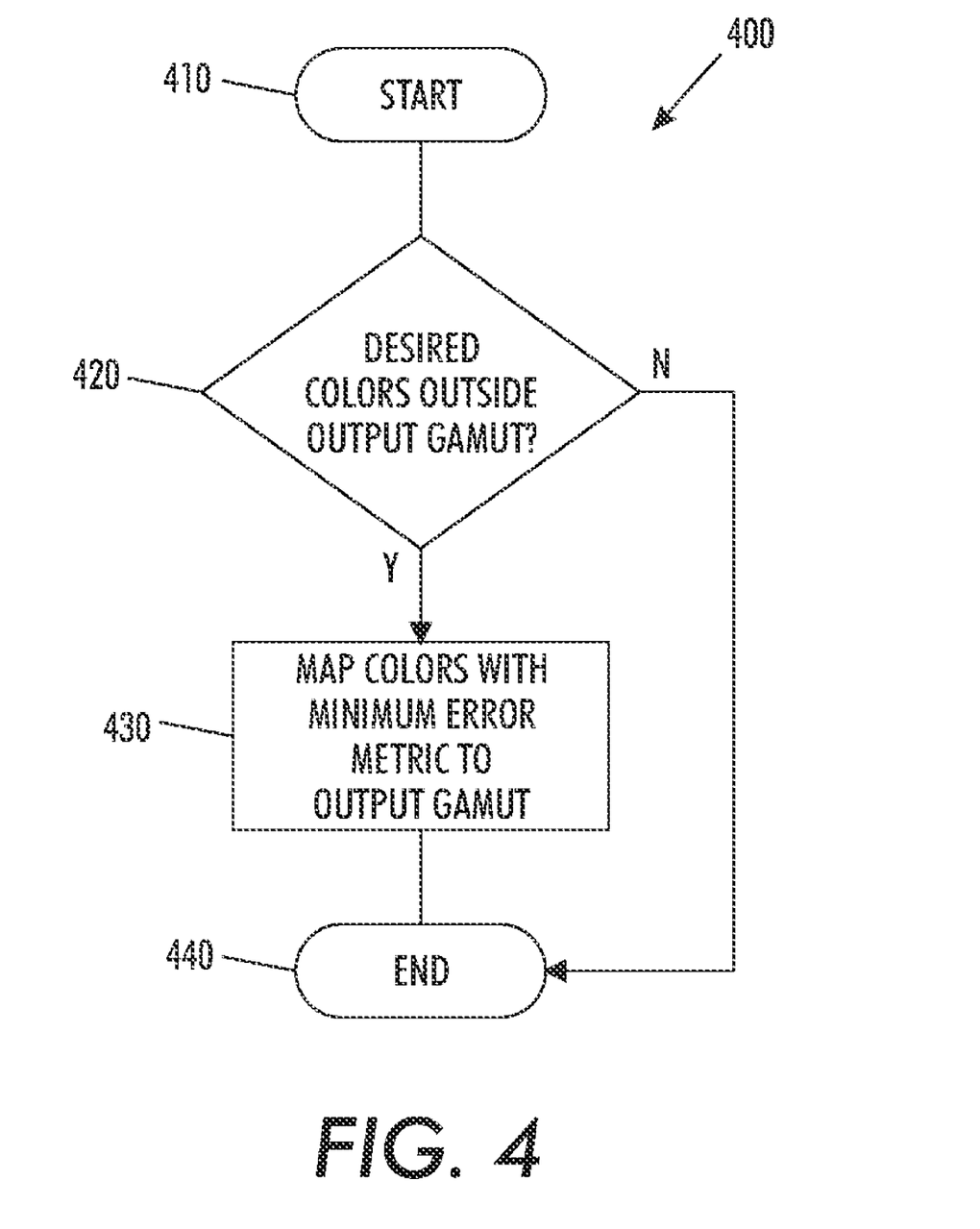
FIG. 4 is an exemplary flowchart of a method of controlling color of a clear coated image on media.

FIG. 4 is an exemplary flowchart 400 of a method of controlling color of a clear coated image on media. The flowchart 400 can operate in conjunction with the flowchart 200. The method starts at 410. At 420, a determination is made as to whether desired colors of a clear coated output image are outside of an image output gamut achievable by the image output settings. If desired colors of the clear coated output image are outside of the image output gamut achievable by the image output settings, at 430, colors with a perceptually minimum color error metric between the desired colors of the clear coated output image and the image output gamut achievable by the image output settings are mapped to the image output gamut. For example, the closest color achievable by a color marking system to a desired reference color may not exactly match the desired reference color. The desired reference color may be outside of an image output gamut achievable by image output settings of a marking engine. The image output gamut can be the color gamut achievable on the clear coated output image. Other gamut mapping methods, such as chromatic gamut mapping, cusp mapping, or other mapping techniques may be used if desired colors are outside of an image output gamut achievable by the image output settings. For example, one color can be sampled at a time, the desired color of the output image can be compared with colors in the image output gamut achievable by the image output settings, and colors can be chosen with the minimum color error metric between the two. The chosen colors can be colors reproducible by a printing device that result in a coated image perceptually closest to the desired colors. At 440, the method ends.

Thus, embodiments can provide for controlling color for clear coated images on media. For example, spot colors can be printed on corresponding patches on a page at different locations. For example, an 8.5×11" sheet may have 11 patches. Different patch sizes may be used and different sized sheets can have different numbers of patches. Multiple sheets can be used to accommodate additional patches. The spot colors can have a particular color metric values and/or definitions. A spot color can have a L*a*b* value that is based on industry standard spot colors or that is user defined. A user can indicate a particular area of an image is a particular color and that color can be used as a spot color in a test patch. This can be done because a designer may create an image using a monitor that has colors based on Red Green and Blue (RGB) values. To print the image on a page, RGB image values can be converted to printing device specific values, such as CMYK values. The page can then be processed by coating the page with a clear coat. Such a coating can change the perceived color of the image. To accommodate for the change, a color control process can be employed that includes measuring spot colors using a spectrophotometer. The spectrophotometer can accurately measure colors in L*a*b* space, which can be an industry standard color space used by a spectrophotometer. The L*a*b* space can include three device independent parameters with L* representing lightness and a* and b* containing hue and chroma information. The L*a*b* values can be different from printer's CMYK values and a monitor's RGB values. For example, a spectrophotometer can measure reflective spectra of visible light and the measured spectra can be converted into L*a*b* values. Then any error between the L*a*b* values from the spectrophotometer and desired L*a*b* values for a desired image can be determined for a particular printer at a particular time because printers can drift and inks can age. Color corrections can be made to the printer's color recipe to adjust for any errors. For example, a printer's CMYK settings can be adjusted. The process can iterate until it is determined that a test patch has the correct or optimal spot color. The desired image can then be printed with corrected colors.

Furthermore, embodiments can prevent color shift in spot colors after a printed sheet is coated with a clear coat. Inline or offline spectrophotometric measurements can be made of clear coated test samples that have test patches including colors of interest. Adjustments can be made based on the measurements and the process can iterate one or more times until the desired or optimal target colors are achieved. In places where the color is shifted outside of a printer's gamut, the colors with a minimum color error metric can be mapped to the printer gamut while compensating for the clear coating.

For example, spot colors can be used to match colors from a printed piece or design, such as colors from a logo, to specific colors desired by a user. When the spot colors are printed and clear coated, the resulting color from the finished product can be different from the desired color. The embodiments can make the processed spot color of clear coated prints the same or, if the gamut shift is large, as close as possible to the desired color.

Embodiments may preferably be implemented on a programmed processor. However, the embodiments may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the embodiments may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the embodiments. For example, one of ordinary skill in the art of the embodiments would be enabled to make and use the teachings of the disclosure by simply employing the elements of the independent claims. Accordingly, the preferred embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

We claim:

1. A method comprising:
   providing reference color information corresponding to a desired color of a desired output image;
   producing an output image on media using image output settings;
   coating the output image on the media with a clear coat finish to create a clear coated output image on the media;
   measuring, with a sensor, color attributes of the clear coated output image to provide color information of the clear coated output image;
   determining a difference between the color information of the clear coated output image and the reference color information;
   adjusting the image output settings according to the difference between the color information and the reference color information to achieve adjusted image output settings that create a clear coated output image on the media that has color information closer to the reference color information;
   producing a next output image on media using the adjusted image output settings; and
   coating the next output image on the media with a clear coat finish to create a clear coated next output image on the media.

2. The method according to claim 1, wherein producing the output image comprises producing an output image having at least one test patch on the media, the at least one test patch including a color of interest.

3. The method according to claim 1, further comprising:
   measuring, with a sensor, color attributes of the clear coated next output image to provide color information of the clear coated next output image;
   ascertaining whether an optimal color has been achieved based on the color information of the clear coated next output image; and
   repeating, if the optimal color has not been achieved, determining a difference, adjusting image output settings, producing a next output image, coating the next output image, and measuring color attributes.

4. The method according to claim 3, wherein ascertaining whether an optimal color has been achieved comprises ascertaining whether an optimal color has been achieved based on the difference between the color information of the clear coated next output image and the reference color information being below a color error metric threshold.

5. The method according to claim 1, further comprising:
   ascertaining whether desired colors of the clear coated output image are outside of an image output gamut achievable by the image output settings; and
   if desired colors of the clear coated output image are outside of the image output gamut achievable by the image output settings, mapping, to the image output gamut, colors with a perceptually minimum color error metric between the desired colors of the clear coated output image and the image output gamut achievable by the image output settings.

6. The method according to claim 1, further comprising:
   measuring, with a sensor, color attributes of the clear coated next output image to provide color information of the clear coated next output image;
   determining adjusted image output settings are optimal based on the color information of the clear coated next output image; and
   producing a final output image on media based on the adjusted image output settings if the adjusted image output settings are optimal.

7. The method according to claim 1,
   wherein measuring color attributes comprises measuring, with a spectrophotometric sensor, color attributes of the clear coated output image to provide color information of the clear coated output image, the color information of the clear coated output image including L*a*b* values, and wherein the reference color information includes L*a*b* information corresponding to a desired color of the clear coated output image on the media.

8. The method according to claim 1, wherein the clear coat finish comprises one selected from the group of an ultraviolet clear coat finish and an aqueous clear coat finish.

9. An apparatus comprising:
a controller configured to control operations of the apparatus;
a memory coupled to the controller, the memory including reference color information corresponding to a desired color of an output image;
a front end configured to provide a marking engine control signal corresponding to the desired color of the output image;
a color marking engine coupled to the front end, the color marking engine configured to generate an image on media responsive to the marking engine control signal using image output settings;
a clear coat finisher configured to coat the image on the media with a clear coat to create a clear coated image on the media; and
a sensor configured to measure color attributes of the clear coated image and configured to provide color information of the clear coated image,
wherein the controller is configured to determine a difference between the color information of the clear coated image and the reference color information, and configured to adjust the image output settings according to the difference between the color information and the reference color information to achieve adjusted image output settings.

10. The apparatus according to claim 9, wherein the color marking engine is configured to generate an image having at least one test patch on the media using the image output settings, the at least one test patch including a color of interest.

11. The apparatus according to claim 9,
wherein the color marking engine is configured to produce a next image on media using the adjusted image output settings,
wherein the clear coat finisher is configured to coat the next image on the media with a clear coat finish to create a clear coated next image on the media,
wherein the sensor is configured to measure color attributes of the clear coated next image to provide color information of the clear coated next image, and
wherein the controller is configured to ascertain whether an optimal color has been achieved based on the color information of the clear coated next image, and configured to repeat, if an optimal color has not been achieved, determining a difference, adjusting image output settings, producing a next image, coating the next image, and measuring color attributes.

12. The apparatus according to claim 11, wherein the controller is configured to ascertain whether an optimal color has been achieved based on the difference between the color information of the clear coated next image and the reference color information being below a color error metric threshold.

13. The apparatus according to claim 9, wherein the controller is configured to ascertain whether desired colors of the clear coated image are outside of an image output gamut achievable by the image output settings, and if the desired colors of the clear coated image are outside of the image output gamut achievable by the image output settings, configured to map, to the image output gamut, colors with a minimum color error metric between the desired colors of the clear coated output image and the image output gamut achievable by the image output settings.

14. The apparatus according to claim 9,
wherein the color marking engine is configured to produce a next image on media using the adjusted image output settings,
wherein the clear coat finisher is configured to coat the next image on the media with a clear coat finish to create a clear coated next image on the media,
wherein the sensor is configured to measure color attributes of the clear coated next image to provide color information of the clear coated next image, and
wherein the controller is configured to determine adjusted image output settings are optimal based on the color information of the clear coated next image and configured to instruct the color marking engine to produce a final output image on media based on the adjusted image output settings if the adjusted image output settings are optimal.

15. The apparatus according to claim 9,
wherein the sensor comprises a spectrophotometric sensor configured to measure color attributes of the clear coated image to provide color information of the clear coated image, the color information of the clear coated image including L*a*b* values, and
wherein the reference color information includes L*a*b* information corresponding to a desired color of an output image on the media.

16. The apparatus according to claim 9, wherein the clear coat comprises one selected from the group of an ultraviolet clear coat and an aqueous clear coat.

17. The apparatus according to claim 9, wherein the clear coat finisher changes the perceived color of the image on the media when coating the image on the media with a clear coat.

18. The apparatus according to claim 9, wherein the controller is coupled to the sensor and the clear coat finisher.

19. An apparatus comprising:
a controller configured to control operations of the apparatus;
a memory coupled to the controller, the memory including reference color information having L*a*b* information corresponding to a desired color of a desired output image on media;
a front end configured to provide a marking engine control signal corresponding to the desired color of the desired output image;
a color marking engine coupled to the front end, the color marking engine configured to generate an image on media responsive to the marking engine control signal using image output settings;
an ultraviolet finisher configured to coat the image on the media with an ultraviolet coat to create an ultraviolet coated image on the media; and
a spectrophotometric sensor configured to measure color attributes of the ultraviolet coated image and provide color information of the ultraviolet coated image based on the measured color attributes, the color information of the ultraviolet coated image including L*a*b* values,
wherein the controller is configured to determine a difference between the color information of the ultraviolet coated image and the reference color information, and configured to adjust the image output settings according to the difference between the color information and the reference color information to achieve adjusted image output settings that create an ultraviolet coated image on the media that has color information closer to the reference color information, and wherein the color marking engine is configured to produce a next image on media using the adjusted image output settings.

20. The apparatus according to claim 19, wherein the color marking engine is configured to generate an image having at least one test patch on the media using the image output settings, the at least one test patch including a color of interest corresponding to the desired output image.

* * * * *